(12) United States Patent
Hall et al.

(10) Patent No.: US 7,969,819 B2
(45) Date of Patent: Jun. 28, 2011

(54) METHOD FOR TAKING TIME-SYNCHRONIZED SEISMIC MEASUREMENTS

(75) Inventors: David R. Hall, Provo, UT (US); Christopher Durrand, Pleasant Grove, UT (US)

(73) Assignee: Schlumberger Technology Corporation, Houston, TX (US)

(*) Notice: Subject to any disclaimer, the term of this patent is extended or adjusted under 35 U.S.C. 154(b) by 0 days.

(21) Appl. No.: 11/682,758

(22) Filed: Mar. 6, 2007

(65) Prior Publication Data

US 2008/0217057 A1 Sep. 11, 2008

Related U.S. Application Data

(63) Continuation-in-part of application No. 11/382,324, filed on May 9, 2006, now Pat. No. 7,453,768.

(51) Int. Cl.
*G01V 1/00* (2006.01)
(52) U.S. Cl. .......................... 367/80; 340/853.3
(58) Field of Classification Search ........ 175/1; 367/25, 367/57, 81, 82; 702/6
See application file for complete search history.

(56) References Cited

U.S. PATENT DOCUMENTS

| | | |
|---|---|---|
| 3,206,477 A | 9/1965 | Kalbfell |
| 4,293,936 A | 10/1981 | Cox |
| 4,298,970 A | 11/1981 | Shawhan |
| 4,363,112 A | 12/1982 | Widrow |
| 4,578,675 A | 3/1986 | MacLeod |
| 4,602,375 A | 7/1986 | Inukai |
| 4,839,644 A | 6/1989 | Safinya et al. |
| 4,901,289 A | 2/1990 | Cretin et al. |
| 5,062,084 A | 10/1991 | Schoepf et al. |
| 5,113,379 A | 5/1992 | Scherbatskoy |
| 5,157,392 A | 10/1992 | Zimmer |
| 5,191,557 A | 3/1993 | Rector |
| 5,331,318 A | 7/1994 | Montgomery |
| 5,419,405 A | 5/1995 | Patton |
| 5,511,038 A | 4/1996 | Angeleri |
| 5,585,556 A | 12/1996 | Petersen |
| 5,689,688 A | 11/1997 | Strong |
| 5,774,418 A | 6/1998 | Magendie |
| 6,026,913 A * | 2/2000 | Mandal et al. .............. 175/45 |
| 6,094,401 A | 7/2000 | Masak |
| 6,131,658 A | 10/2000 | Minear |
| 6,131,694 A * | 10/2000 | Robbins et al. ............ 181/105 |
| 6,181,642 B1 | 1/2001 | Coates |
| 6,208,586 B1 | 3/2001 | Rorden et al. |
| 6,237,404 B1 | 5/2001 | Crary |
| 6,269,310 B1 | 7/2001 | Washbourne |
| 6,308,137 B1 | 10/2001 | Underhill |
| 6,369,718 B1 | 4/2002 | Mathieu |

(Continued)

*Primary Examiner* — Krystine Breier
(74) *Attorney, Agent, or Firm* — Holme Roberts & Owen LLP (57) ABSTRACT

A method for taking seismic measurements that includes a downhole sensor positionable within a tool string located within the bore of a well, the tool string having a network which effects communication with a downhole sensor. The downhole sensor includes a downhole clock that may be placed in communication over the network with the top-hole clock for synchronization. A seismic source is positioned within a transmitting distance of the downhole sensor and activated at a time when the network is disconnected. The downhole sensor records signals from the seismic source at along with a downhole timestamp from the downhole clock. When the network is reconnected, the downhole clock and the top-hole clock are re-synchronized and any downhole clock drift is calculated. The recorded downhole timestamp may then be adjusted to reflect what it would have been if the downhole clock had been synchronized with the top-hole clock.

20 Claims, 10 Drawing Sheets

U.S. PATENT DOCUMENTS

| | | |
|---|---|---|
| 6,424,595 B1 | 7/2002 | Chenin |
| 6,439,046 B1 * | 8/2002 | Kruspe et al. ............. 73/152.01 |
| 6,580,751 B1 | 6/2003 | Gardner et al. |
| 6,614,360 B1 | 9/2003 | Leggett |
| 6,614,718 B2 | 9/2003 | Cecconi |
| 6,868,037 B2 | 3/2005 | Dasgupta |
| 6,912,465 B2 | 6/2005 | Collins |
| 6,942,034 B2 | 9/2005 | Harmon et al. |
| 7,134,033 B2 | 11/2006 | Kim |
| 7,142,129 B2 * | 11/2006 | Hall et al. ................. 340/853.3 |
| 7,167,031 B2 | 1/2007 | Ishii |
| 7,180,332 B2 | 2/2007 | Di Gregorio |
| 7,253,671 B2 * | 8/2007 | Hall et al. ..................... 327/165 |
| 7,453,768 B2 * | 11/2008 | Hall et al. ....................... 367/82 |
| 2002/0066309 A1 | 6/2002 | Tubel |
| 2002/0075114 A1 | 6/2002 | Hall |
| 2002/0126021 A1 | 9/2002 | Vinegar |
| 2002/0149501 A1 | 10/2002 | Beique |
| 2002/0195247 A1 | 12/2002 | Ciglenec |
| 2003/0014190 A1 | 1/2003 | Dubinsky |
| 2003/0142586 A1 | 7/2003 | Shah |
| 2003/0218939 A1 * | 11/2003 | Casarsa et al. ................. 367/35 |
| 2004/0011559 A1 * | 1/2004 | Harvey et al. ................... 175/50 |
| 2004/0112594 A1 | 6/2004 | Aronstam |
| 2004/0124994 A1 | 7/2004 | Oppelt |
| 2005/0034917 A1 | 2/2005 | Mathiszik |
| 2005/0035874 A1 | 2/2005 | Hall |
| 2005/0035875 A1 | 2/2005 | Hall |
| 2005/0104743 A1 | 5/2005 | Ripolone |
| 2005/0140374 A1 | 6/2005 | Itskovich |
| 2005/0149266 A1 | 7/2005 | Mathiszik |
| 2006/0180349 A1 * | 8/2006 | Dashevskiy ..................... 175/40 |
| 2007/0009075 A1 | 1/2007 | Miller |
| 2007/0025483 A1 | 2/2007 | Emami-Neyestanak |
| 2007/0033294 A1 | 2/2007 | Ungermann |
| 2007/0047663 A1 | 3/2007 | Murdock |
| 2007/0153628 A1 * | 7/2007 | Mathiszik et al. .............. 367/57 |

* cited by examiner

Fig. 10

METHOD FOR TAKING TIME-SYNCHRONIZED SEISMIC MEASUREMENTS

CROSS REFERENCE TO RELATED APPLICATIONS

This application is a continuation in part of U.S. patent application Ser. No. 11/382,324; filed May 9, 2006, now U.S. Pat. No. 7,453,768; which is herein incorporated by reference for all that is contains.

BACKGROUND OF INVENTION

This invention relates to oil and gas drilling, and more particularly to apparatus and methods for recording downhole seismic measurements. The introduction of the wired pipe networks into the oil and gas drilling industry allows downhole clocks to be continuously synchronized with top hole clock sources. U.S. Pat. No. 7,142,129, U.S. Pat. No. 7,253,671 and U.S. Pat. No. 7,453,768, which are herein incorporated by reference for all that they disclose, deal with various aspects of taking downhole seismic measurements using wired pipe. However, there are instances where the tool string may be disconnected from the surface, such as when adding or removing pipe during drilling or tripping and other instances which breaks communication between the top-hole and downhole clocks. During these breaks timing accuracy of any recordings taken downhole may be inaccurate since the downhole clocks may drift.

BRIEF SUMMARY OF THE INVENTION

In one aspect of the present invention a method has steps for taking downhole measurements. A network integrated into a downhole tool string in a well bore may be in communication with a downhole sensor, which has a downhole clock that is in communication over the network with and synchronized with a top-hole clock. A signal source may be within a transmitting distance of the downhole sensor and may be activated while the network is connected or disconnected from the top-hole clock. The downhole sensor may record a portion of the signals from the signal source at a time recorded by the downhole clock when the network is disconnected. When the network is reconnected, the downhole clock and the top-hole clock are re-synchronized and the clock drift that occurred during the disconnection may be calculated. The recorded time may then be adjusted to reflect the actual time according to the top-hole clock.

Clock synchronization pulses may be generated by the top hole master clock source which are received by the downhole clocks. A divisor number may be determined after comparing the clock synchronization pulses with oscillation from the downhole clock which adjusts the downhole clock. Electronic time stamps may be used to measure transmission latency between processing elements. The network may also have hardware that fixes computational latency to known constants.

The seismic source may be a top-hole source, a cross-well source or a source located within the well bore. The seismic source may be a seismic generator, a sonic source, induction sources, an explosive, a compressed air gun or array, a vibrator, a sparker, a speaker, or combinations thereof. The top-hole clock source may be disposed within a GPS, a network server, surface equipment, a satellite, or combinations thereof. The downhole sensor may be a single-axis geophone, a three-axis or three-component geophone, an accelerometer (single axis or tri-axial), an induction receiver, an electrode, a nuclear sensor, a hydrophone array, or a combination thereof. Also, the tool string may be deployed in a drill string, a production string, an injection string, a casing string, or combinations thereof.

A stabilizer may be attached to the tool string and may have at least two stabilizer blades with a pocket adapted to receive a downhole sensor comprising three geophones oriented at three different orthogonal axes. In some embodiments there are three to five stabilizer blades and there is a set of geophones in each. Typically at least one of the stabilizer blades may contact the formation, thereby improving the coupling that the set of geophones may have with the formation. Since there are several sets of geophones more recordings may be taken per each seismic shot produced at the surface; thus increasing the acquisition efficiency. The recordings from the several sets of the geophones may also be averaged or otherwise treated mathematically to reduce downhole and or system noise, allowing for more accurate data per surface seismic shot. The acquisition sequence may be completely controlled by the engineer at surface and complex downhole state determining algorithms are not required. The downhole sensors and electronics may be adapted to take measurements according to programmable acquisition parameters which may be controlled at the surface. Such parameters may include gain, sample rate, filtering, and combinations thereof.

DETAILED DESCRIPTION OF EXEMPLARY EMBODIMENTS

Figure 1:
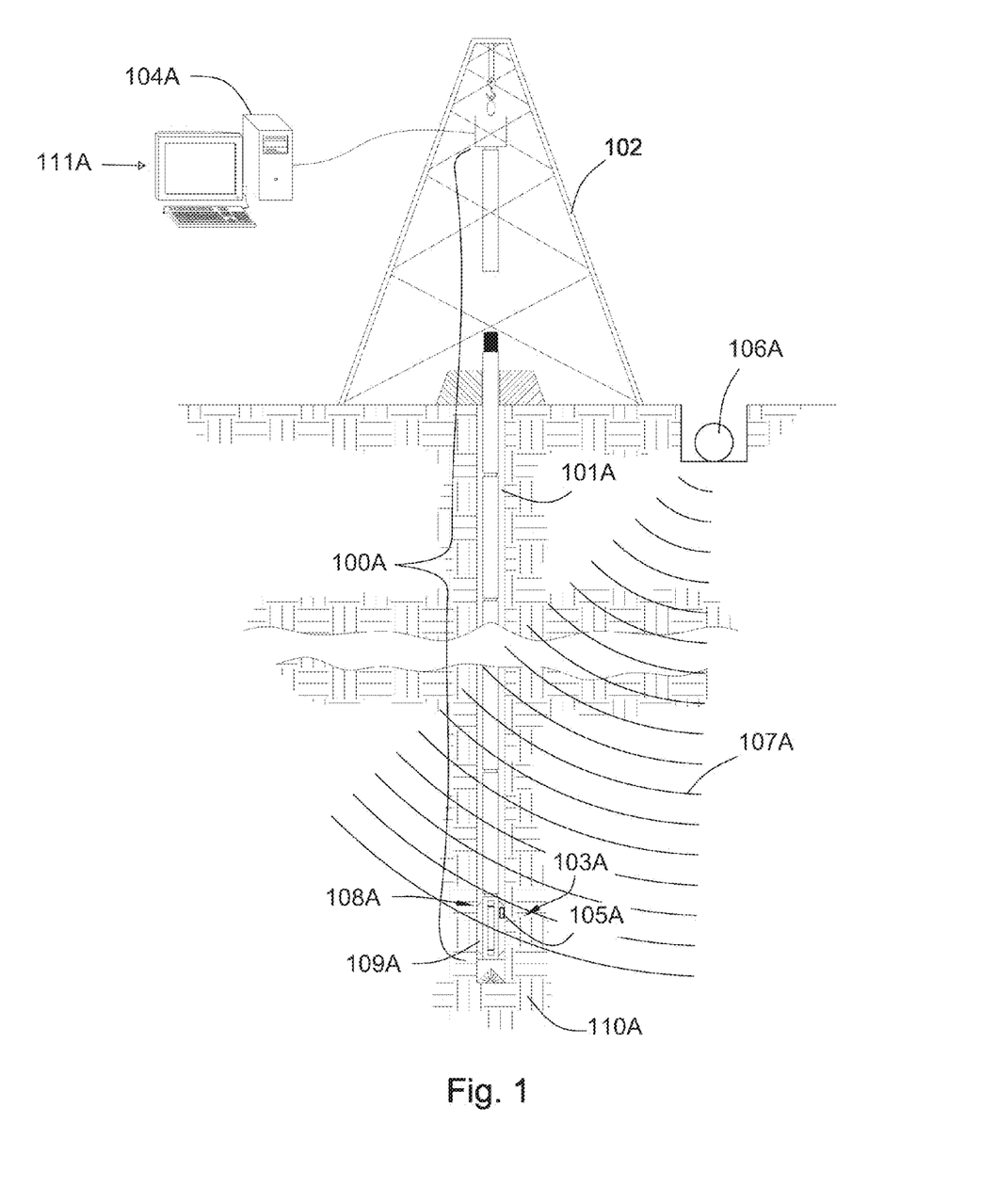
FIG. 1 is a schematic illustration of a downhole tool string suspended in a well bore.

FIG. 1 shows a schematic illustration of a downhole tool string 100A suspended in a well bore 101A. A derrick 102 supports the tool string 100A. In this embodiment the tool string 100A may be a drill string. In other embodiments, the tool string 100A may also be a production string, an injection string, a casing string, a horizontal drill string or combinations thereof.

A downhole communications network 103A may be integrated into the tool string 100A. The network 103A may transmit data to surface equipment. A downhole network compatible with the present invention is disclosed in U.S. Pat. No. 6,670,880 to Hall which is herein incorporated by reference for all that it discloses. In the preferred embodiment, the downhole communications network 103A transmits data to top-hole equipment or top-hole processor 111A for real time processing and analysis. The top-hole equipment comprises a clock source 104A. The top-hole equipment or processor 111A may include a GPS device, network servers, surface equipment, computers, laptops, satellites, recording equipment, processing software or combinations thereof.

A downhole sensor package or array thereof 105A may be in communication with the downhole communications network 103A, the downhole sensor 105A having a downhole clock which is in communication over the communications network 103A with the top-hole clock source 104A. In the preferred embodiment, the downhole clock and the top-hole clock 104A are synchronized through the downhole communications network.

A seismic source or generator 106A of one or more seismic waves 107A may be within transmitting distance of the downhole sensor 105A through the formation or strata 110A. In the embodiment of FIG. 1, the seismic source 106A is a top-hole seismic generator. In other embodiments, the seismic source 106A may be a cross-well seismic generator or may be located within the well bore. The seismic source 106A may be a seismic generator, a sonic source, an explosive, a compressed air gun or array, a vibrator, a sparker, or combinations thereof.

In the preferred embodiment, a stabilizer 108A may be attached to the tool string 100A and may have at least two stabilizer blades 109A, but preferably have at least three to five blades. The downhole sensor 105A may be disposed within one of the stabilizer blades 109A. At least one stabilizer blade 109A may contact the formation or strata 110A so as to help keep the tool string 100A centralized in the well bore 101A. The stabilizer blades 109A may have a pocket adapted to receive vibration measuring devices such as geophones or accelerometers. It is believed that most of the time at least one of the stabilizer blades will be in contact with the formation, thereby allowing at least one of the sensor pockets to at least almost always be in contact with the formation thereby improving the coupling between the downhole sensor 105A and the formation 110A.

The downhole communications network 103A enables the downhole tool string 100A to acquire seismic data during the entire drilling process. While drilling is taking place, drill bit energy may be recorded by the various sensors (geophone, hydrophone and accelerometers) and this data used to build a look ahead seismic image. Such data may also be used to determine accelerations, shocks and vibrations that impact the drill string while drilling is taking place.

In addition, drilling may be stopped intentionally at any time or may stop due to the drilling process and conventional surface source seismic may be recorded. It is not necessary, however, to wait for pauses in the drilling process, nor is it necessary to detect the downhole condition remotely by the tool, since the instruction to start or stop data acquisition is sent from surface through the network.

While drilling is taking place and for any number of different reasons, the top-hole equipment 111A may be disconnected from the rest of the tool string 100A causing the down-hole clock (not shown) to lose communication with the top-hole clock source 104A. Through various physical phenomena (including temperature variations) the down-hole clock will drift during the disconnected time and may not exactly reflect the time as maintained by the surface clock 104A. When the downhole communications network 103A is reconnected to the top-hole clock source, the downhole clock and the top-hole clock may be re-synchronized. Any clock drift that occurred is then measured, sent to surface and each record of seismic data corrected accordingly.

In some embodiments, the seismic signal source may be located within the well bore 101. The seismic sources may be drilling hammers, drill bit energy, jars, perforating guns, piezoelectric stacks, or combinations thereof.

Figure 2:
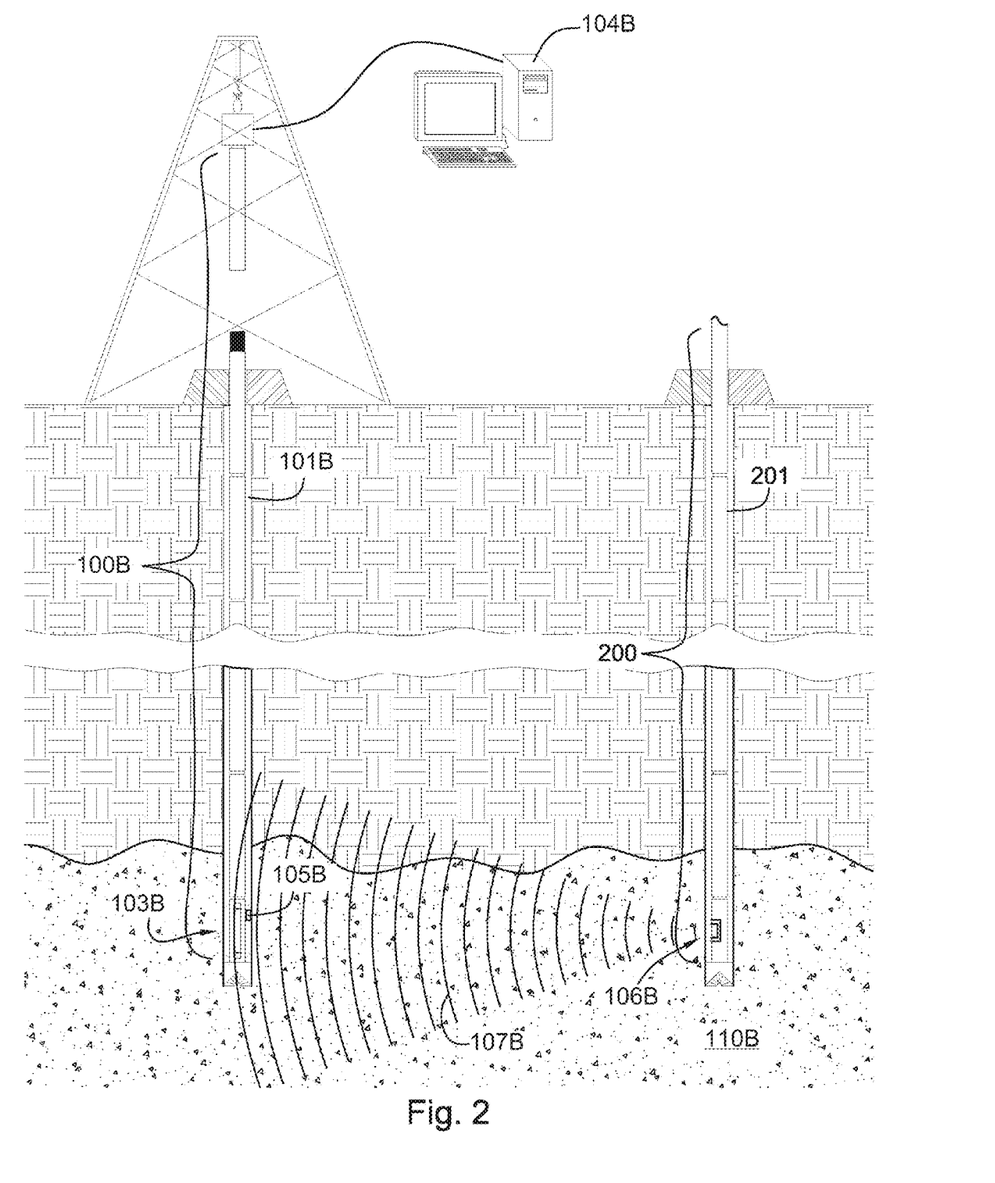
FIG. 2 is a schematic illustration of another downhole tool string suspended in a well bore.

FIG. 2 is a of another downhole tool string 100B suspended in a well bore 101B. In some embodiments, there may be two or more tool strings 100B, 200 disposed in two or more well bores 101B, 201. In some cases a wire line tool may be disposed within one of the well bores. The seismic source 106B may be a cross-well source and may be within a transmitting distance of a downhole sensor package or packages 105B. The downhole sensor 105B in well bore 101B may record the properties of the one or more seismic waves 107B generated by the seismic source 106B in the well bore 201 as it passes through the formation or strata 110B between the two wells 101B, 201 which may be used to generate a model of the formation. Because the measurements are taken closer to the formation 110B of interest and more of the signal will be concentrated to the formation of interest, a better model of the formation may be derived.

The downhole sensor 105B may have a downhole clock that is in communication over the network 103B with a top-hole clock source 104B and be synchronized. Cross-well seismic shots may be performed while one of the tool string comprising a sensor package 105B is disconnected and its associated downhole clock is drifting. When the network 103B and the top-hole clock source 104B are reconnected, the downhole and top-hole clock sources may be resynchronized. Any clock drift that may have occurred during the disconnection may be calculated so that the recorded time may be adjusted to reflect what it would have been if the downhole clock had been synchronized with the top-hole clock source 104B.

Figure 3:
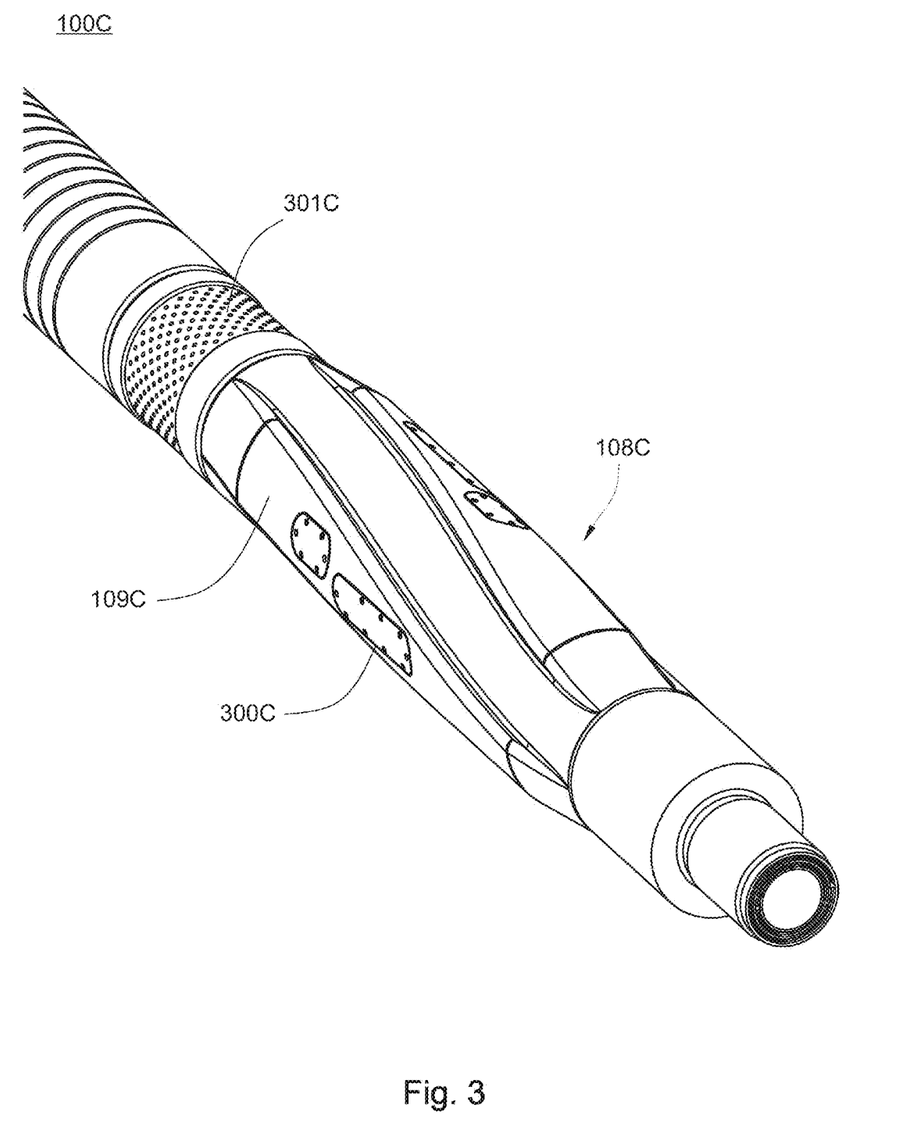
FIG. 3 is a perspective diagram of a seismic tool.

FIG. 3 is a of a stabilizer 108C attached to a tool string 100C. The stabilizer blades 109C may have a pocket 300C adapted to receive geophones or accelerometers. In some embodiments a hydrophone 301C may be mounted to the tool string 100C and may be adapted to detect and measure vibrations or other seismic waves propagating to the tool string 100C, as well as tube waves or other pressure waves that may be propagating through the borehole from the surface, drill bit, or other sources.

When the tool string 100C is disposed in a well bore, at least one stabilizer blade 109C may contact the formation which may allow better coupling of geophones, hydrophones, accelerometers, or other downhole sensor to the borehole. More accurate readings may be received because the seismic wave is not altered by the characteristics of the borehole or those of the tool before the seismic wave is recorded.

Figure 4:
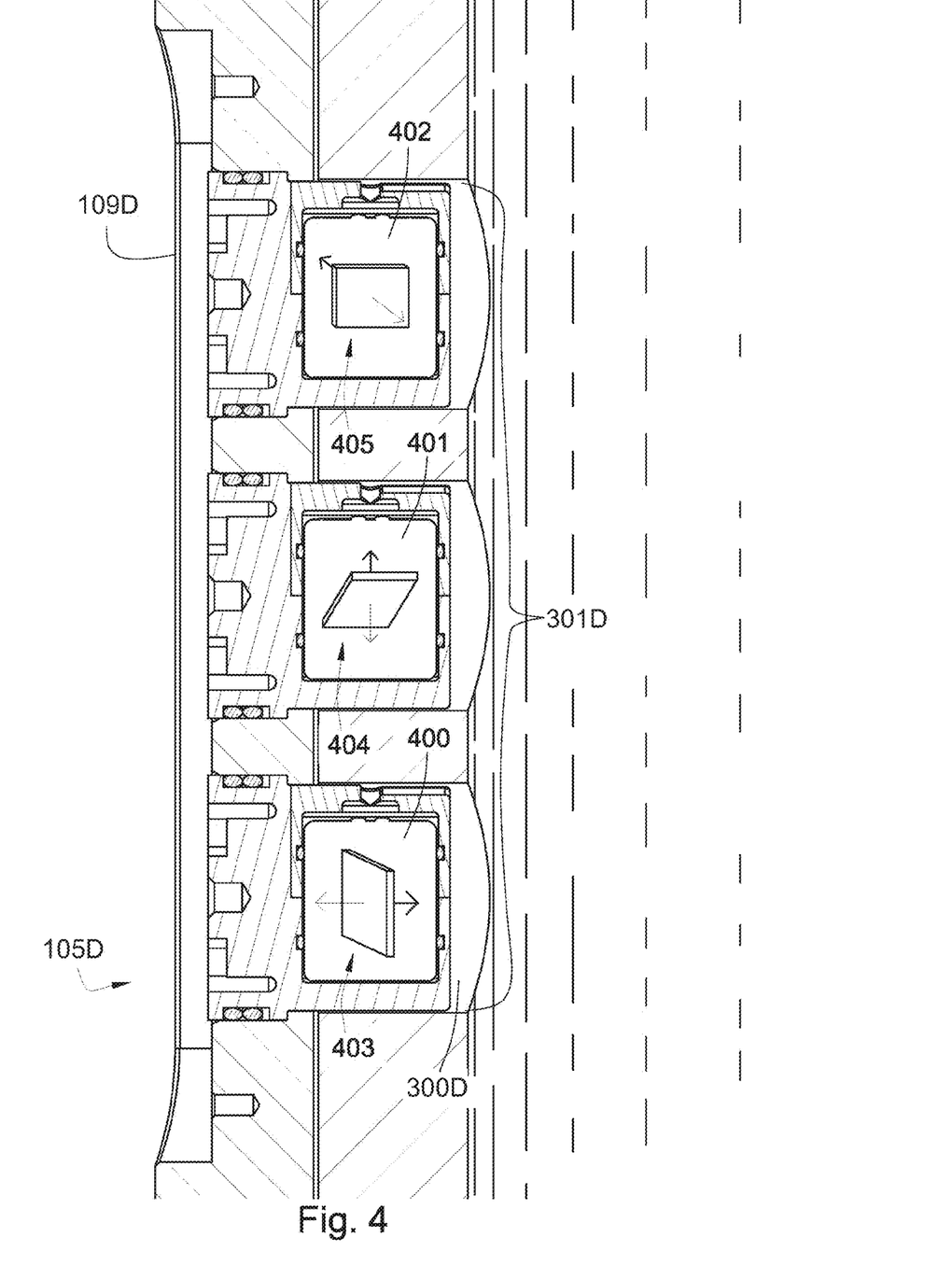
FIG. 4 is a cross-sectional side view of one embodiment of a downhole sensor integrated into a stabilizer blade.

FIG. 4 is a cross-sectional side view of one embodiment of a downhole sensor 105D integrated into a stabilizer blade 109D. In the illustrated embodiment, the downhole sensor 105D may be a three component geophone 301D. In other embodiments, the downhole sensor may be a geophone, an accelerometer, an induction receiver, an electrode, a nuclear sensor, or a hydrophone. The stabilizer blade 109D may have a pocket 300D adapted to receive at least three downhole geophones, wherein each geophone 400, 401, 402 per pocket receives signals on different orthogonal axes. For example, the first geophone 400 may be adapted to receive and measure signals in the Z direction 403 with respect to a three-dimensional coordinate system. The second geophone 401 may be adapted to receive and measure signals in the Y direction 404 with respect to a three-dimensional coordinate system and the third geophone 402 may be adapted to receive and measure signals in the X direction 405. It may be beneficial to incorporate a three-dimensional downhole sensor; the data from which may aid the drillers to more accurately steer the tool string.

Figure 5:
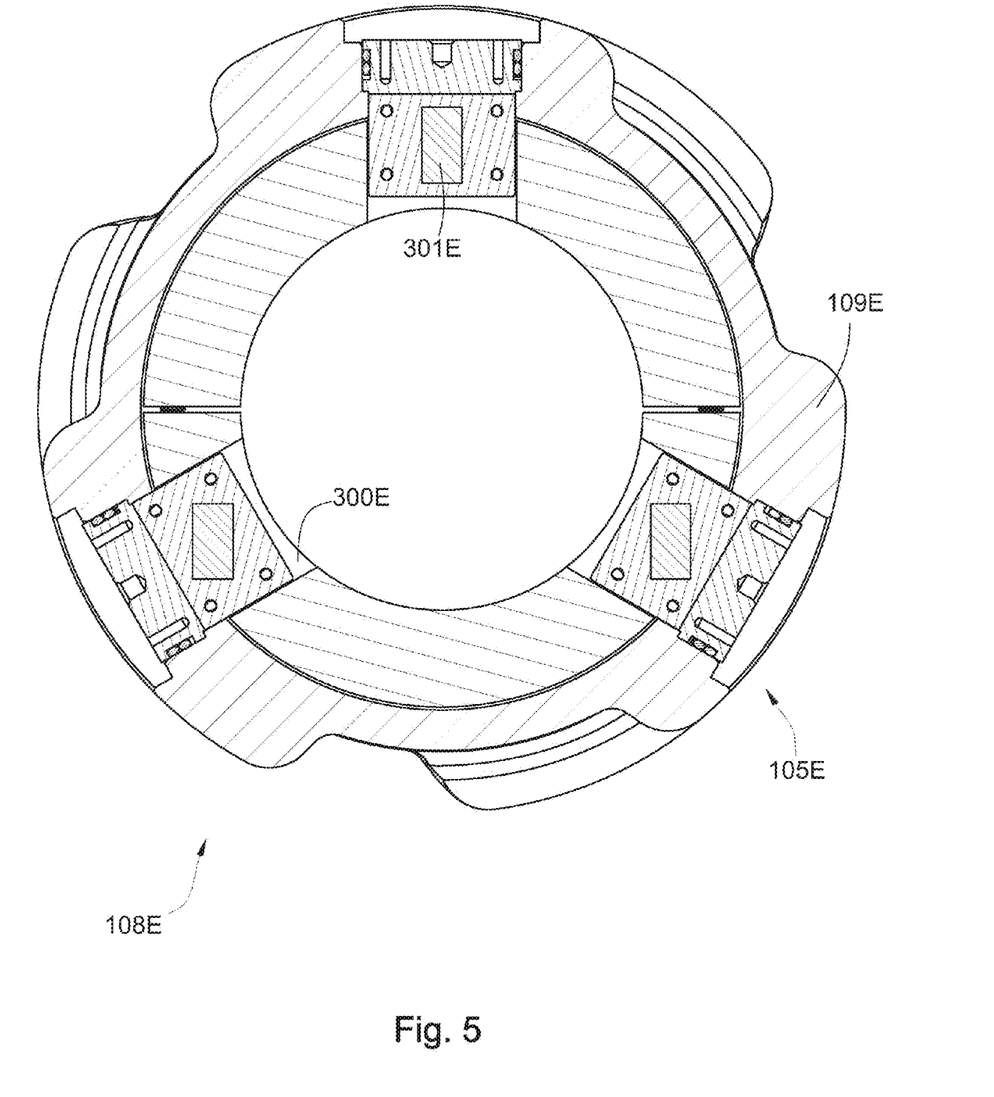
FIG. 5 is a cross-sectional top view of another embodiment of a downhole sensor integrated into a stabilizer blade.

FIG. 5 is a cross-sectional top view of another embodiment of a downhole sensor 105E integrated into a stabilizer blade 109E on a stabilizer 108E. The stabilizer 108E may be attached to a tool string. In this embodiment, the downhole sensor 105E may be geophones 301E or accelerometers disposed within a pocket 300E of the stabilizer blade 109E. When disposed in a well bore, at least one stabilizer blade 109E may contact the formation, thus centralizing the tool string in the well bore. At least one geophone may also be in communication with the formation so as to accurately receive signals from a signal source such as a top-hole source or a cross-well source.

Figure 6:
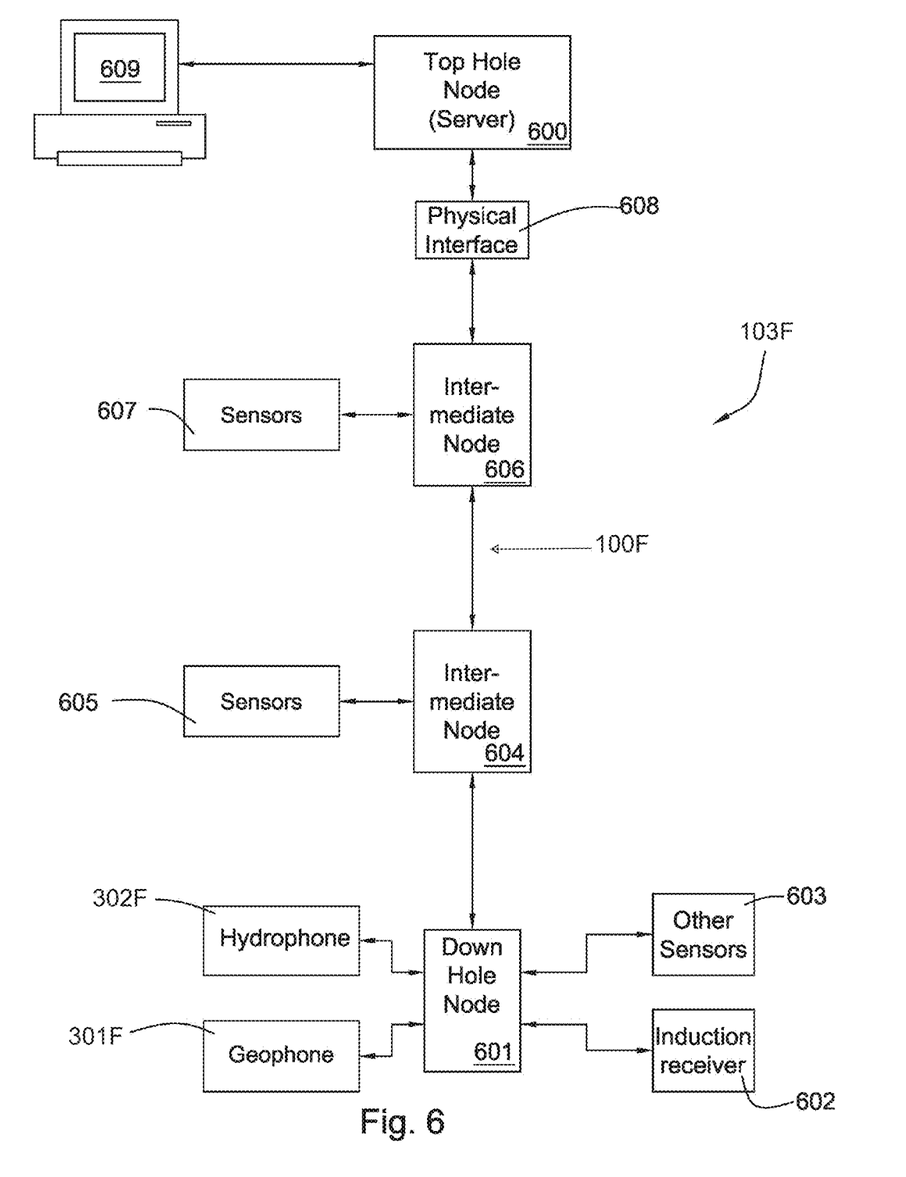
FIG. 6 is a schematic block diagram illustrating one embodiment of various tools and sensor interfacing with a network in accordance with the invention.

FIG. 6 is a schematic block diagram illustrating one embodiment of various tools and sensor interfacing with a downhole network 103F. The downhole network may include a top-hole node 600 and a downhole node 601. The downhole node 601 may interface to various components located in or proximate a downhole assembly. For example, a downhole node 601 may interface to a geophone 301F, a hydrophone 302F, an induction receiver 602 or other sensors 603.

A downhole node 601 may communicate with an intermediate node 604 located at an intermediate point along the tool string 100F. The intermediate node 604 may also provide an interface to sensors 605 communicating through the network. Likewise, other nodes, such as a second intermediate node 606, may be located along a tool string to communicate with other sensors 607. Any number of intermediate nodes 604, 606 may be used along the network between the top-hole node 600 and downhole node 601.

In some embodiments, a physical interface 608 may be provided to connect network components to the tool string. For example, since data may be transmitted directly up the tool string on cables or other transmission media integrated directly into the tool string components, the physical interface 608 may provide a physical connection to the tool string so data may be routed off of the tool string to network components, such as the top-hole node 600, or personal computer 609.

For example, a top-hole node 600 may be connected to the physical interface 608. The top-hole node 600 may also be connected to an analysis or logging device such as a personal computer 609. The personal computer 609 may be used to analyze or log data gathered from various downhole tools or sensors.

In this embodiment, it is common that clock drift may occur as data is received and transmitted between nodes and/or sensors. Electronic time stamps may be used to measure transmission latency between these processing elements. Also, clock drift may occur as the various components analyze or log data. Thus, the network may have hardware that fixes computational latency to a known constant.

Figure 7:
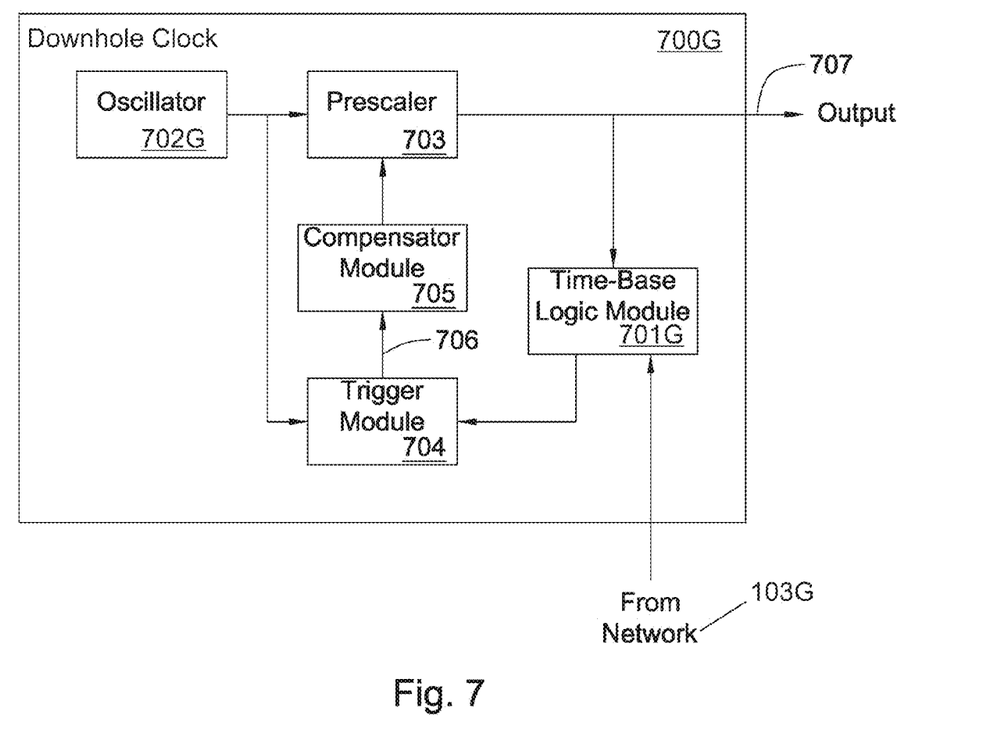
FIG. 7 is a schematic block diagram illustrating one embodiment of a downhole clock in accordance with the invention, wherein the clock is configured to compensate for drift.

FIG. 7 is a schematic block diagram illustrating one embodiment of a downhole clock 700G, wherein the clock is configured to compensate for clock drift. In the preferred embodiment, a time-base logic module 701G calculates clock drift by comparing the downhole clock 700G to the top-hole clock (not shown). The time-base logic module 701G synchronizes the downhole clock with the top-hole clock. Some downhole tools or sensors, such as seismic devices, require that data be precisely time-stamped to be useful. Thus, it is important that clocks remain synchronized and accurate and compensate for clock drift in the event that the connection and thus synchronization is lost.

In some embodiments, a downhole clock 700G may include an oscillator 702G that creates a series of pulses at a rated frequency. Most oscillators 702G exhibit some frequency instability that can cause drift over a period measured in seconds, minutes, hours, etc. Many crystal oscillators 702G experience drift caused by a shift in frequency as a function of temperature. The amount of clock drift may be exacerbated by temperatures encountered in a downhole environment. Thus, in downhole environments, the frequency fluctuation of oscillators 702G may be significantly more pronounced than it would be above the surface. Other common downhole causes of clock drift may include crystal instability, vibration, pressure, crystal aging, shocks, mounting structure, bending loads on the crystal or combinations thereof.

An oscillator 702G may be operably connected to a prescaler 703. Generally, a prescaler 703 is configured to generate a clock pulse after it has received a certain number of input pulses from the oscillator 702G. For example, a "Divide-by-N" prescaler may generate a clock pulse after it has received N input pulses. The basic objective of a prescaler 703 is to provide a series of clock pulses to a larger, slower counter by dividing a higher incoming pulse frequency. The output from the prescaler may form the basis for a downhole clock 700G. The time-base logic module 701G may be responsible for keeping time based on the output from the prescaler 703.

During the drilling process, the downhole communications network 103G is occasionally disconnected from the top-hole clock source (not shown) for a short time for addition or removal of pipe, testing, or other reasons. Often this time is used to activate seismic shots to record measurements downhole since the tool string is not rotating or otherwise moving during this period. While the communications network 103G is disconnected from the top-hole clock source, the time-base logic module 701G may not be able to compare the top-hole clock signals to the downhole clock 700G signals, allowing the downhole clock drift to occur without correction.

Once the communications network 103G and the top-hole clock source are reconnected the downhole clock signals may be compared to the top-hole clock signals obtained through the network. By comparing these two signals, the drift of the downhole clock 700G may be calculated. If clock drift occurs during the disconnection, amount of drift may be calculated by subtracting the downhole clock time from the top-hole clock time. Further, it may be desired to calculate the actual time, relative to the top-hole clock source, of a certain event that may have occurred downhole during the disconnection. In some embodiments, the actual time of an event may be calculated by subtracting the time the seismic shot was received times the clock drift divided by the total time of the disconnection from the time the seismic shot was received. In its simplest form, an example of how the real time of an event may be calculated is described in the following expression:

$$\text{Received Time} - (\text{Received Time})(\text{clock drift}/\text{total time of disconnect}) = \text{actual time of event}$$

In some embodiments, the drift may be measured in parts per million (ppm) or parts per billion (ppb) which expresses the drift in terms of a number of errant pulses for every million pulses. For example, if the drift is measured at 200 ppm, then the clock pulse has drifted from the reference time by 200 pulses for every million pulses output. Once this error rate, or drift, is calculated, this number may be used to take appropriate corrective or compensative action.

Other methods of clock synchronization and recalculation may be used. Methods described in U.S. Pat. Nos. 5,689,688; 7,180,332; 7,167,031; 7,134,033; 4,602,375 and U.S. Patent Applications 20070033294; 20070025483; 20070009075; all of which are herein incorporated by reference for all that they disclose, may be compatible with the present invention.

The time-base logic module 701G may be operably connected to a trigger module 704. The prescaler 703 may be connected to a compensator module 705 configured to adjust a preloaded number. The compensator module 705 may be controlled by the trigger module. The trigger module 704 may be programmed to send a trigger signal 706 at calculated intervals to modify settings of the prescaler 703. The trigger module 704 may also be configured to trigger the compensator module 705 to adjust the preloaded number. A series of electrical clock pulses or signals may be produced after counting a preloaded number of electrical pulses from the oscillator 702G. Time may be measured based on the electrical clock pulses. Thus, clock drift may be calculated and compensated for by adjusting the preloaded number. For example, depending on clock drift, it may be determined that a correction needs to be made after every 80,000 pulses from the oscillator 702G. In some embodiments, the trigger module 704 is simply a counting circuit that counts 80,000 pulses before sending a trigger signal 706.

The trigger signal 706 may be received by the compensator module 705. The compensator module 705 may be configured to load a number into the prescaler 703. For example, if the prescaler 703 normally waits for 16 pulses from the oscillator 702G before outputting a clock signal or pulse, the compensator module 705 may increase or reduce this number. This may have the effect of advancing or retarding the timing of the output signal 707. In some embodiments, the compensator module 705 simply changes the number loaded into the prescaler 703 for a single cycle. For example, if the prescaler 703 normally waits for 16 oscillator pulses before outputting a clock pulse, the compensator module 705 may reprogram the prescaler 703 to wait 17 oscillator pulses before outputting a clock pulse for one cycle, and then return to the normal operating mode of waiting for 16 pulses. Thus, the compensation module 705 may temporarily change the number that is loaded into the prescaler 703 to either advance or retard the timing of the output 707.

Figure 8:
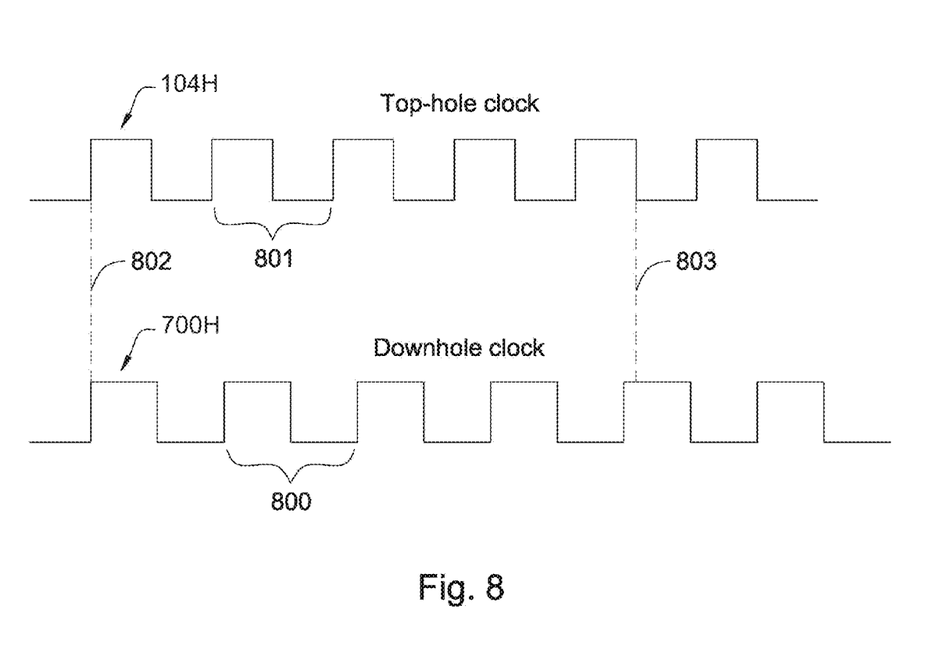
FIG. 8 is a representation of electrical pulses from two clocks in which a downhole clock drifts from a top-hole clock.

FIG. 8 is a representation of electrical signals or pulses from two clocks in which a downhole clock 700H drifts from a top-hole clock 104H. For this particular illustration, the oscillators in both the downhole clock 700H and the top-hole clock 104H are rated at the same frequency. When in a downhole environment, changes in temperature and pressure may affect the frequency at which an oscillator emits pulses.

In this embodiment, the downhole clock 700H has developed a drift from the top-hole clock 104H, causing the period 800 of a cycle in the downhole clock to be slightly more than the period 801 of a cycle in the top-hole clock. Although at one moment 802 in time the clocks 104H, 700H are synchronized, at another moment 803 the top-hole clock 104H has completed five pulses and the downhole clock 700H has not yet completed five pulses, creating a situation of oscillator drift. The present invention provides a way to correct such clock drift that occurs when the network is disconnected from the top-hole clock in order to record accurate downhole measurements.

Figure 9:
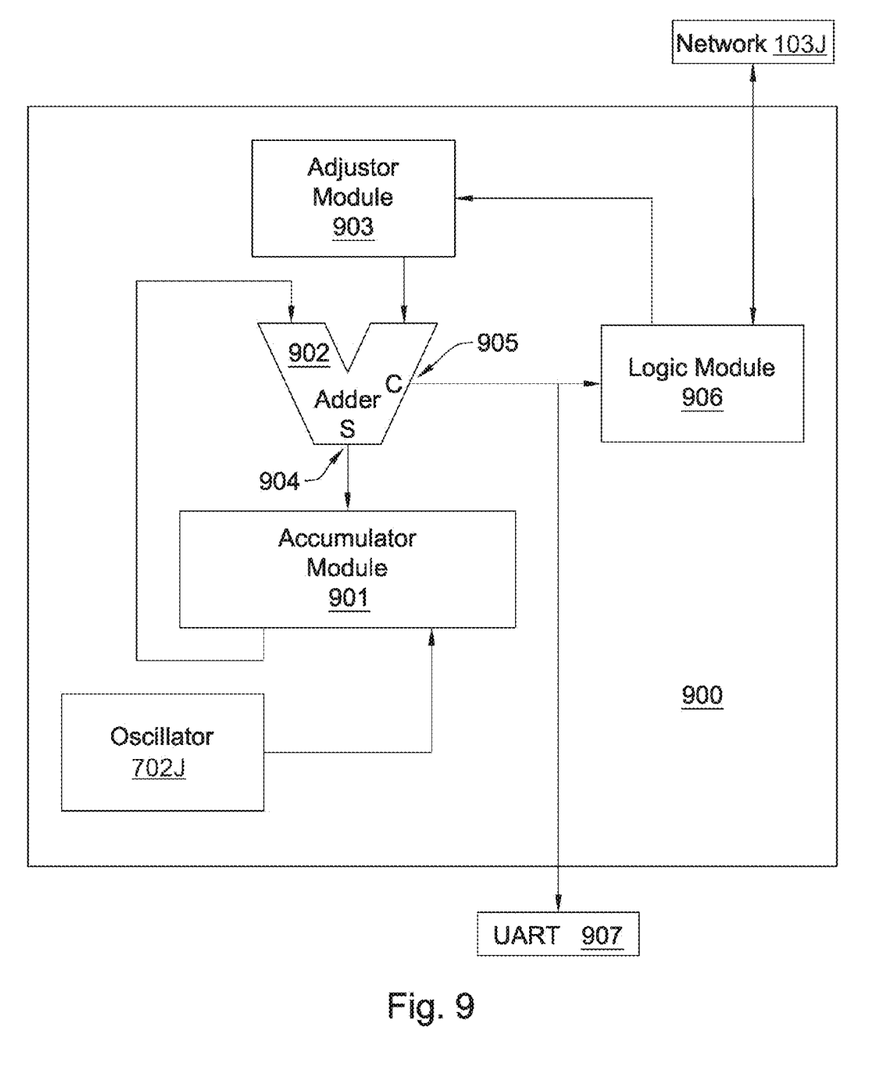
FIG. 9 is a schematic block diagram illustrating one embodiment of an apparatus comprising a system according to the present invention.

FIG. 9 is a schematic block diagram illustrating one embodiment of circuit or apparatus 900 for use in a system according to the present invention. In this embodiment, a baud rate generator apparatus 900 may have a system for setting or adjusting a frequency of output pulses received from an oscillator 702J in a downhole communications network 103J. In some embodiments, the oscillator 702J may be incorporated into a downhole clock.

The baud rate generator apparatus 900 may comprise an oscillator 702J configured to output electrical pulses at a certain frequency. Many different oscillators 702J may be configured to operate in this type of apparatus 900. For example, an oscillator 702J may comprise a crystal, a transistor-based circuit, an RC circuit, an LC circuit, or an RLC circuit. Oscillators 702J have some amount of inherent clock drift due to natural properties. This drift may be measured over a period of time. Most oscillators 702J are also affected in some way by changes in temperature, pressure, vibration, pressure, crystal aging, shocks, mounting structure, bending loads on the crystal or combinations thereof The oscillator 702J may be configured to output electrical pulses to an accumulator module 901, to which it is operably connected. The accumulator module 901 is configured to receive pulses from the oscillator 702J, output an accumulated value, and store a new accumulated value. The accumulator module 901 is operably connected to a digital adder 902, and may output its stored accumulated value to the adder 902. The accumulator module 901 may also receive a sum value from the digital adder 902 and store it. The digital adder 902 is configured to receive values from the accumulator module 901 and an adjustor module 903 and add them together. Digital adders 902 may have a sum output 904 and a carry output 905. In this embodiment, the sum output 904 of the digital adder 902 is operably connected to the accumulator module 901, and the carry output 905 is operably connected to a logic module 906.

The adjustor module 903 is configured to store an adjustor value and output it to the digital adder 902. In some embodiments, the adjustor module 903 may be a memory register. The adjustor value may be modified periodically in order to compensate for clock drift from the oscillator 702J or to change the baud rate frequency. Clock drift may occur during a disconnection between the top-hole clock source and the downhole communications network 103J.

The logic module 906 is configured to receive an electrical pulse from the digital adder 902 whenever an addition is performed that produces a carry value. The logic module 906 is further configured to change the adjustor value stored in the adjustor module 903. If the apparatus 900 is functioning solely as a baud rate generator, it is not required to keep time based on the electrical pulses received in order to function properly. However, even if the apparatus 900 is functioning primarily as a baud rate generator, the logic module 906 may still be configured to keep time based on the output pulses it receives. This particular characteristic proves useful in calculating and correcting clock drift. The logic module 906 may also comprise a connection to the downhole communications network 103J.

A network communications device such as a universal asynchronous receiver/transmitter (UART) 907 may also be connected to the apparatus 900 and configured to receive electric pulses corresponding to carry values from the digital adder 902.

Figure 10:
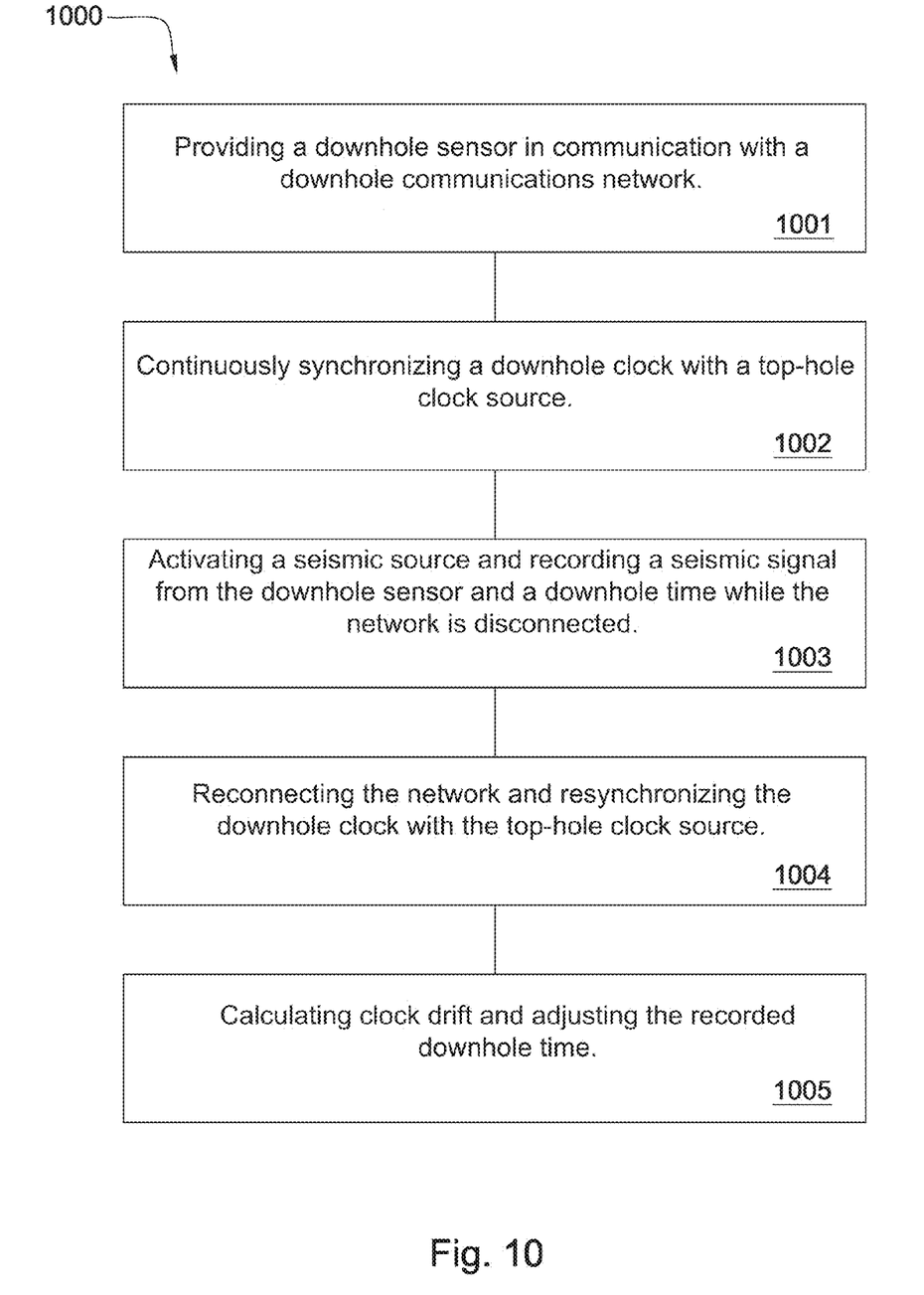
FIG. 10 is a flow chart illustrating one embodiment of a method for taking downhole measurements according to the present invention.

FIG. 10 is a flow chart illustrating one embodiment of a method 1000 for taking downhole measurements. The method 1000 includes providing 1001 a downhole sensor in communication with a downhole communications network that is integrated into a tool string. The method also includes continuously synchronizing 1002 a downhole clock with a top-hole clock source. The downhole clock may be integrated into the downhole sensor and may be in communication over the communications network with the top-hole clock source.

The method 1000 includes activating 1003 a seismic source while the communications network is disconnected from the top-hole clock source to generate one or more seismic waves. The seismic waves may be sensed by the downhole sensor which generates and supplies a seismic signal reflective of the one or more seismic waves, and which seismic signal is then recorded in a data recorder along with a downhole time from the downhole clock. The method 1000 includes reconnecting 1004 the network and re-synchronizing the downhole clock with the top-hole clock source. Clock drift may occur while the downhole communications network and the top-hole clock source were disconnected due to temperature or pressure changes. Further the method 1000 includes calculating 1005 clock drift and adjusting the recorded downhole time from the downhole clock. The steps of calculating clock drift and adjusting the recorded downhole time may take place at an up-hole or downhole location. The recorded downhole measurements may be temporarily stored downhole while the network is disconnected and then sent to the surface for further processing. In other embodiments, the adjustments may be calculated downhole and sent to the surface.

The present invention may also apply to other LWD measurements include resistivity measurements, nuclear measurements, acoustic measurements, caliper measurements, pressure measurements, torque measurements, WOB measurements, strain measurements, and combinations thereof.

Whereas the present invention has been described in particular relation to drawings attached hereto, it should be understood that other and further modifications apart from those shown or suggested herein, may be made within the scope and spirit of the present invention.

What is claimed is:

1. A method for taking downhole measurements in a well having a bore extending from a well head into strata, the method comprising:
   providing a seismic source for generating a seismic wave at a selected time $t_{surface}$;
   providing a top-hole processor for processing and storing seismic data;
   providing a top-hole clock for generating time signals including time $t_{surface}$;
   providing a tool string for positioning in the bore, the tool string having communications means for communicating signals through the bore to the well head;
   providing a downhole sensor for positioning in the tool string and for connection with the communications means, the downhole sensor being configured to sense the seismic wave and to generate and to supply a seismic signal reflective of the seismic wave, the downhole sensor including:
   a downhole clock, the downhole clock being configured for communication over the communications means with the top-hole clock,
   a data recorder to receive and record the seismic signal, and
   circuit means for receiving time signals from the top-hole clock and the downhole clock, the circuit means being configured to calculate the difference between time signals;
   positioning the downhole sensor in the tool string to sense the seismic wave when the tool string is positioned in the bore,
   connecting the downhole sensor to the communications means;
   positioning the tool string in the bore to locate the sensor in a position to sense the seismic wave;
   positioning the seismic source spaced from the well head to transmit the seismic wave into the strata;
   positioning the top-hole processor proximate the well head;
   connecting the top-hole clock to the seismic source;
   connecting the communications means to the top-hole processor and the top-hole clock;
   operating the circuit means to cause the downhole clock and the top-hole clock to be synchronized;
   interrupting the communications means between the downhole clock and the top-hole clock;
   operating the seismic source to generate the seismic wave and to transmit the seismic wave into the strata;
   sensing the seismic wave with the downhole sensor and causing the downhole sensor to generate the seismic signal and supply the seismic signal to the data recorder;
   operating the downhole clock to generate and supply the time $t_{downhole}$ to the circuit means and to the data recorder when the seismic signal is received by the data recorder;
   reconnecting the communications means between the downhole clock and the top-hole clock;
   operating the circuit means to receive a reference time signal $t_{downhole\ reference}$ from the downhole clock source and a reference time signal $t_{top\text{-}hole\ reference}$ from the top-hole clock source and to calculate any difference $t_{diff}$ in time signals between the time signal $t_{downhole\ reference}$ and the time signal $t_{top\text{-}hole\ reference}$;
   operating the circuit means to adjust the time $t_{downhole}$ by the time difference $t_{diff}$ to determine time $t_{actual}$ and to supply time $t_{actual}$ to the data recorder;
   operating the data recorder to supply at least the seismic signal and the time $t_{actual}$ to the top-hole processer via the communications means; and
   operating the top-hole processor to compare time $t_{surface}$ and time $t_{actual}$ and determine a true time for the seismic wave to travel through the strata from the seismic source to the sensor.

2. The method of claim 1, wherein the seismic source is a top-hole seismic generator or a cross-well seismic generator.

3. The method of claim 1, wherein the seismic source is located within the bore.

4. The method of claim 1, wherein the seismic source is selected from the group consisting of a seismic generator, a sonic source, an explosive, a compressed air gun, a vibrator, a sparker, and an electromagnetic device.

5. The method of claim 1, wherein the top-hole clock is included within a GPS, a server, surface equipment, or a satellite.

6. The method of claim 1, wherein the downhole sensor is a selected from the group consisting of a geophone, a 3-component geophone, an induction receiver, an electrode, a nuclear sensor, an accelerometer and a hydrophone.

7. The method of claim 1, wherein the tool string is a drill string, a production string, an injection string, casing string, or combinations thereof.

8. The method of claim 1, further comprising a stabilizer attached to the tool string, the stabilizer including at least two stabilizer blades, each of the at least two stabilizer blades having a pocket, and each of the pockets being adapted to receive at least one downhole sensor.

9. The method of claim 8, wherein each downhole sensor includes an assembly of three geophones, each geophone in the assembly of geophones being configured to sense the seismic wave on a different orthogonal axis.

10. The method of claim 1, wherein the downhole clock includes an oscillator.

11. The method of claim 1, wherein the circuit means is operable to synchronize the downhole clock with the top-hole clock.

12. A method for taking seismic measurements in a well having a bore extending from a well head into strata, said method comprising:

providing a seismic generator for generating a seismic wave at a selected time $t_{surface}$;

providing a top-hole processor for processing and storing seismic data;

providing a top-hole clock for generating time signals including time $t_{surface}$;

providing a sensor to sense said seismic wave and to generate and to supply a seismic signal reflective of said seismic wave;

providing a data recorder connectable to said sensor to receive and record said seismic signal;

providing a downhole clock configurable to generate time signals including time $t_{downhole}$;

providing a circuit means for receiving time signals from said top-hole clock and said downhole clock, said circuit means being configured to calculate a difference between time signals;

obtaining a tool string, said tool string having communications means for communicating signals through said bore to said well head;

positioning said sensor in said tool string to sense said seismic wave when said tool string is positioned in said bore, positioning said data recorder, said downhole clock and said circuit means in said tool string and interconnecting said data recorder, said downhole clock and said circuit means with said sensor and said communications means;

providing connection means for connecting said top-hole clock with said communications means, said connection means being operable between a connected position for said communication of signals therethrough and a disconnected position in which signals are not transmitted therethrough;

causing said tool string to be positioned in said bore to locate said sensor in a position to sense said seismic wave;

positioning said seismic generator spaced from said well head to transmit a seismic wave into said strata;

positioning said top-hole processor proximate said well head;

connecting said top-hole clock to said seismic generator;

connecting said communications means to said connection means and connecting said connection means to said top-hole processor and said top-hole clock;

operating said circuit means to cause said downhole clock and said top-hole clock to be synchronized;

operating said connecting means from said connected position to said disconnected position;

operating said top-hole clock to supply a time signal $t_{surface}$ to said top-hole processor and to said seismic generator;

operating said seismic generator to generate a seismic wave and to transmit said seismic wave into said strata;

sensing said seismic wave with said sensor and operating said sensor to generate said seismic signal and supply said seismic signal to said data recorder;

operating said downhole clock to generate and supply said time $t_{downhole}$ to said circuit means and to said data recorder when said seismic signal is received by said data collector;

operating said connection means from said disconnected position to said connected position to connect said top-hole clock to said circuit means through said communications means;

operating said circuit means to receive a reference time signal $t_{top\text{-}hole\ reference}$ from said top hole clock and a reference time signal $t_{downhole\ reference}$ from said down hole clock and to calculate any difference $t_{diff}$ in time signals between said time signal $t_{top\text{-}hole\ reference}$ and said time signal $t_{downhole\ reference}$;

operating said circuit means to adjust said time $t_{downhole}$ by said time difference $t_{diff}$ to determine time $t_{actual}$ and to supply time $t_{actual}$ to said data recorder;

operating said data recorder to supply at least said seismic signal and said time $t_{actual}$ to said top-hole processer via said communications means; and operating said top-hole processor to compare time $t_{surface}$ and time $t_{actual}$ and determine a true time for said seismic wave to travel through said strata from said seismic generator to said sensor.

13. The method of claim 12, further comprising operating said circuit means to cause said downhole clock to synchronize with said top-hole clock.

14. The method of claim 12, wherein said communications means comprises at least one conductor formed into said tool string.

15. The method of claim 12, wherein said tool string is selected from the group consisting of a drill string, a production string, an injection string, a casing string and a wireline tool.

16. The method of claim 12, wherein said tool string comprises a stabilizer attached to said tool string, said stabilizer including at least two stabilizer blades, each of said stabilizer blades having a pocket, and each of said pockets being adapted to receive said at least one sensor.

17. The method of claim 12, wherein said sensor comprises a three-component geophone adapted to sense a seismic wave along three substantially orthogonal axes.

18. The method of claim 12, wherein said downhole clock includes an oscillator.

19. The method of claim 18, wherein said oscillator comprises a crystal oscillator.

20. A method for taking seismic measurements in a bore of a well, said method comprising:

obtaining a seismic generator for generating a seismic wave at a selected time $t_{surface}$;

obtaining a top-hole processor for processing and storing seismic data;

obtaining a top-hole clock for generating time signals including time $t_{surface}$;

obtaining a sensor to sense said seismic wave and to generate and to supply a seismic signal reflective of said seismic wave;

obtaining a data recorder connectable to said sensor to receive and record said seismic signal;

obtaining a downhole clock configurable to generate time signals including time $t_{downhole}$;

obtaining a circuit means for receiving time signals from said top-hole clock and said downhole clock, said circuit means being configured to calculate a difference between time signals;

causing said sensor, said data recorder, said downhole clock and said circuit means to be installed in a tool string, said tool string being positionable in said bore, said tool string including communications means for communicating signals through said bore to said well head;

interconnecting said data recorder, said downhole clock and said circuit means with said sensor and said communications means;

causing said tool string to be positioned in said bore to locate said sensor in a position to sense said seismic wave;

positioning said seismic generator spaced from said well head to transmit a seismic wave into said strata;

positioning said top-hole processor proximate said well head;

connecting said top-hole clock to said seismic generator;

connecting said communications means to said connection means and connecting said connection means to said top-hole processor and said top-hole clock;

operating said circuit means to cause said downhole clock and said top-hole clock to be synchronized;

interrupting said communications means between said downhole clock and said top-hole clock;

operating said top-hole clock to supply a time signal $t_{surface}$ to said top-hole processor and to said seismic generator;

operating said seismic generator to generate a seismic wave and to transmit said seismic wave into said strata;

sensing said seismic wave with said sensor and operating said sensor to generate said seismic signal and supply said seismic signal to said data recorder;

operating said downhole clock to generate and supply said time $t_{downhole}$ to said circuit means and to said data recorder when said seismic signal is received by said data collector;

reconnecting said communications means between said downhole clock and said top-hole clock;

operating said circuit means to receive a reference time signal $t_{top\text{-}hole\ reference}$ from said top hole clock and a reference time signal $t_{downhole\ reference}$ from said down hole clock and to calculate any difference $t_{diff}$ in time signals between said time signal $t_{top\text{-}hole\ reference}$ and said time signal $t_{downhole\ reference}$;

operating said circuit means to adjust said time $t_{downhole}$ by said time difference $t_{diff}$ to determine time $t_{actual}$ and to supply time $t_{actual}$ to said data recorder;

operating said data recorder to supply at least said seismic signal and said time $t_{actual}$ to said top-hole processer via said communications means; and operating said top-hole processor to compare time $t_{surface}$ and time $t_{actual}$ and determine a true time for said seismic wave to travel through said strata from said seismic generator to said sensor.

* * * * *